Jan. 10, 1939. P. C. SMETHURST ET AL 2,143,500
METHOD OF GAUGING PHOTOGRAPHIC EXPOSURES
Filed Jan. 7, 1937
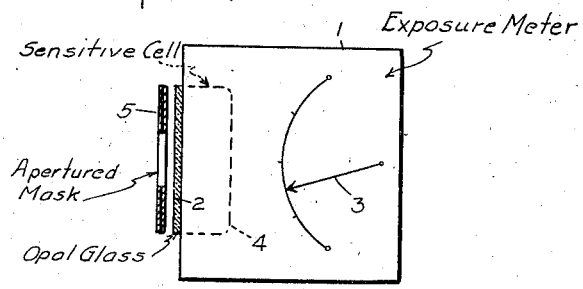
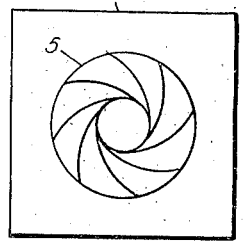
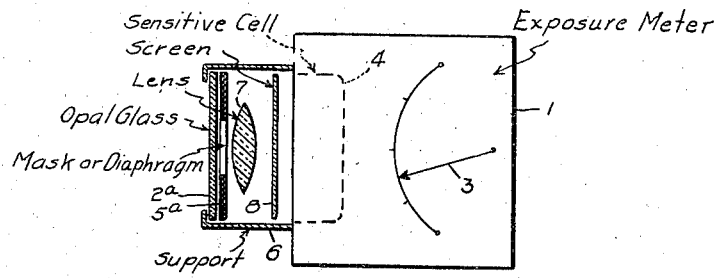
Philip Charles Smethurst
Stanley Sydney Francis
INVENTORS Patented Jan. 10, 1939

2,143,500

UNITED STATES PATENT OFFICE 2,143,500

METHOD OF GAUGING PHOTOGRAPHIC EXPOSURES

Philip Charles Smethurst, Sidcot, Heaton, Bolton, and Stanley Sydney Francis, Sheffield, England Application January 7, 1937, Serial No. 119,410
In Great Britain June 15, 1936

1 Claim. (Cl. 88—23)

This invention relates to improvements in exposure meters for photographic and cinematographic purposes.

In the case of certain photographic light-sensitive materials, more particularly those intended for the production of cinematographic records involving the use either of two light-sensitive emulsions and a printing step, or of a reversal process in which the exposed film is converted into a positive image or those intended to reproduce colours by a two, three or four colour additive or subtractive colour process, it is preferable, in order that the best results may be obtained, to gauge the exposure in accordance with the brightest portions only of the scene to be taken, i. e., by taking into account only the "high lights" of the scene.

As, however, in many scenes there is no true high light present or the area of the high light is insufficient to give a normal reading for exposure, it has been proposed heretofore in carrying out this method of gauging exposure to use a standard reflecting surface which receives the same light as that falling on the principal object in the scene, the brightness of this standard reflecting surface being measured by means of an exposure meter positioned at the camera and directed towards the reflecting surface to ascertain the correct camera exposure for best results. Such standard reflecting surfaces are commonly made of matted white Celluloid or a similar opaque substance, and may be described as "artificial high-lights". The whole method of using artificial high-lights in conjunction with an exposure meter of known type may be conveniently termed a high-light exposure method.

The chief object of the present invention is to provide a more efficient method of ascertaining camera exposures according to the high-light method.

The brightness of any reflecting surface is due to diffuse reflection, regular reflection or a combination of the two. A perfectly diffusing reflecting surface will show a constant brightness value whatever the angle at which it may be viewed, whilst the brightness due to regular reflection changes greatly as the angle between the reflecting surface and the camera axis is altered. Since, however, it is natural for regular reflection to cause a change of brightness as a head, for example, is turned and since it is the desideratum of cinematography that the image on the screen shall be as natural as possible it is permissible in gauging the exposure which is to be given to neglect the regularly reflected brightness and to gauge the exposure only according to the diffuse reflected brightness.

According to the present invention a translucent artificial high light consisting of a flat sheet of material having substantially perfect light diffusing properties is placed in the vicinity of the scene to be taken with one unobstructed surface of the sheet directed towards the brightest light illuminating the scene and a suitable exposure meter, which may be of any known type, is placed on the opposite side of the artificial highlight to that on which the incident light falls so that it is the light transmitted by the artificial high-light which is measured instead of the light reflected therefrom.

The artificial high-light itself must be of a translucent material having good light diffusing properties and a sufficient light transmission to enable a suitable exposure meter reading to be obtained. Opal glass, which gives a spherical or substantially spherical polar curve, is a very suitable substance.

Such an arrangement reduces very greatly the error due to the different angles at which incident light may strike the artificial high-light, and although it is still necessary to tilt the artificial high-light until the exposure meter behind it gives a maximum reading, this reading will be found to be substantially constant over a very much greater angle of inclination than in the case of the opaque artificial high-light used in the known high-light exposure method.

Such a translucent artificial high-light may be simply attached to an exposure meter in order that correct camera exposure may be ascertained with the use of one hand only, and it is immaterial how far the translucent artificial high-light is placed away from the meter so long as its area is sufficiently great to cover the field over which the meter itself is sensitive to light reaching it.

It will be understood that the function of the translucent artificial high-light is one of integrating as accurately as possible all light reaching it, and of transmitting a certain definite portion of this light to the exposure meter. Accuracy sufficient for all practical purposes is obtained with a flat translucent artificial highlight which integrates light reaching it throughout a solid angle of $2\pi$ steradians.

Two embodiments of the exposure meter according to our invention are illustratively exemplified in the accompanying drawing, wherein Fig. 1 shows a longitudinal vertical section of a meter according to the invention;

Fig. 2 is a front elevation of the same meter, and

Fig. 3 illustrates a modified form of the invention in vertical longitudinal section.

The exposure meter illustrated in Figs. 1 and 2 comprises a casing 1 having an aperture in one wall thereof covered with a flat sheet 2 of opal glass giving a substantially spherical polar curve. Rearwardly of the opal glass sheet, there is disposed in the casing 1 a suitable exposure meter 3 having its light sensitive cell 4 directed towards the opal glass sheet to receive the light transmitted by the latter. An apertured mask 5 may be arranged in front of the opal glass sheet 2 in order to correct the reading of the exposure meter so that a direct indication of camera exposure is obtained. This mask, which may, if desired, be detachable, may have one or more apertures of any suitable shape and may, if desired, be provided with an iris or other suitable adjustable diaphragm to adjust the effective size of the aperture or apertures. Such a mask may obviously be positioned at any appropriate point between the translucent artificial high-light and the exposure meter and may also, in some cases, be applied to the front or back of the artificial high-light itself.

The translucent artificial high-light may be tinted, preferably neutral-grey, or its light transmission may be modified in some other manner to reduce the exposure meter reading to the correct value for camera exposure.

The exposure meter may obviously be recalibrated so that it gives a correctly reduced reading for camera exposure.

In the modified embodiment of the invention illustrated in Fig. 3, the arrangement of the individual elements is substantially the same as in Figs. 1 and 2, but the casing 1 is provided with an extension 6 and the flat opal glass sheet 2a is carried on the front face of said extension. The adjustable diaphragm 5a and a lens 7 are disposed in the extension 6 between the sheet 2a and the light sensitive cell 4, and an additional neutral grey filter 8 may be provided between the translucent artificial high-light and the sensitive element of the exposure meter, for the same purpose of reducing the reading of the latter to the correct value for camera exposure.

We claim:—

The herein described method of gauging the exposure to be given to a photographic material in accordance with the brightest portions of a scene to be taken, which method consists in placing a flat sheet of a translucent material having good light diffusing properties in the vicinity of the scene to be taken with one unobstructed surface of the sheet directed toward the main source of the light illuminating said scene, tilting said sheet until the light transmitted by the sheet reaches its highest value, measuring said diffuse transmitted light, and calculating the exposure from the result of said measurement.

PHILIP CHARLES SMETHURST.
STANLEY SYDNEY FRANCIS.